Dec. 10, 1968  R. L. WEBBER  3,415,402

CONTAINER

Filed Aug. 15, 1966

INVENTOR.
ROBERT LOUIS WEBBER

BY Whittemore
Hulbert & Belknap

ATTORNEYS

United States Patent Office 3,415,402
Patented Dec. 10, 1968

3,415,402
CONTAINER
Robert Louis Webber, Winslows Motel, 734 W. Grand
River Ave., Okemos, Mich. 48864
Filed Aug. 15, 1966, Ser. No. 572,408
10 Claims. (Cl. 215—1)

ABSTRACT OF THE DISCLOSURE

A disposable container dissolved on being exposed to normal atmospheric conditions, such as moisture in the air, dew and rain after being opened. The container may be constructed of an inner polyethylene layer for protecting the contents of the container, a polystyrene and aluminum powder layer for adding strength to the inner layer, a subsequent layer of caustic soda and aluminum powder, followed by a layer of temporary polyvinyl alcohol soluble in cold water and an exterior layer of permanent polyvinyl alcohol over the layer of temporary polyvinyl alcohol. In use, on breaking of the exterior layer of permanent polyvinyl alcohol, the temporary polyvinyl alcohol is exposed and dissolves to react with the caustic soda and dissolve the remainder of the container.

---

In the past containers, such as bottles for beverages and the like, were of a permanent nature capable of being reused many times. Recently disposable containers have become widely used. The disposable containers are advantageous in that they need not be returned for refilling and no equipment for sterilization of returned containers is necessary. In addition the disposable containers are less expensive.

The disposable containers of the past however have created a nuisance in many places. Thus, highways, parks, city streets and alleys are often littered with discarded disposable containers. The litter provided thereby has in some States become so objectionable that laws prohibiting the use of disposable containers for some uses have been passed.

It is therefore one of the objects of the present invention to provide an improved disposable container.

Another object is to provide a disposable container which is destroyed by usual environmental conditions after it has been used.

Another object is to provide a disposable container including a bottle constructed of a plurality of separate layers, one of which is responsive to natural environmental conditions to dissolve the other layers and means for selectively exposing the one layer to natural environmental conditions.

Another object is to provide structure as set forth above wherein the bottle includes at least an inner layer for protecting the contents of the bottle, an intermediate layer responsive to normal environmental conditions to dissolve adjacent layers, and an outer layer for protecting the intermediate layer until the contents of the bottle are used.

Another object is to provide structure as set forth above wherein the bottle further contains an additional layer for providing strength and rigidity to the bottle.

Another object to provide structure as set forth above wherein the means for selectively exposing the one layer to natural environmental conditions comprises means for breaking the outer layer of the bottle.

Another object is to provide a container which is selectively self destroying that is simple in construction, economical to manufacture and efficient in use.

Other objects and features of the invention will become apparent as the description proceeds, especially when taken in conjunction with the accompanying drawing, illustrating a preferred embodiment of the invention, wherein.

Figure 1:
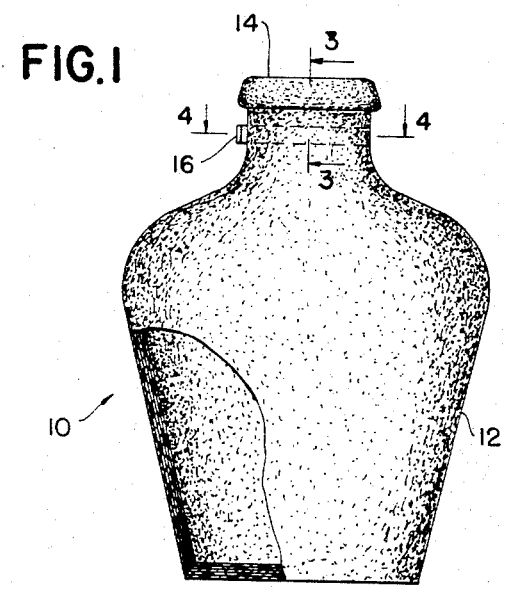
FIGURE 1 is a partially broken away elevation view of a disposable self destroying container constructed in accordance with the invention.

With particular reference to the figures of the drawing, one embodiment of the present invention will now be considered in detail.

The particular container 10 illustrated in FIGURE 1 includes a hollow bottle 12 having a cap 14. The bottle 12 includes a plurality of layers, one of which is responsive to normal environmental conditions, such as moisture in the air, dew and rain, to react with another layer and dissolve the rest of the container 10. Structure 16 is provided to selectively expose the one layer to the normal environmental conditions.

Thus in use the bottle 12 is filled, for example, with a fluid, such as a soft drink or beer and is sealed with the cap 14. The cap 14 is subsequently removed and the contents drained from the bottle 12. Structure 16 is then actuated to expose the one layer of bottle 12 to the normal environmental conditions and the container 10 is dissolved due to interaction of the one layer of the bottle 12 with the other layer thereof and the interaction of the resulting product with the rest of the container.

Figure 2:
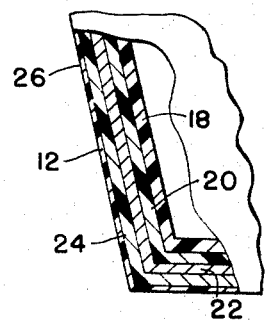
FIGURE 2 is an enlarged partial section view of a portion of the container illustrated in FIGURE 1.

More specifically the bottle 12, as shown, is made up of five separate layers of material. The separate layers of material 18, 20, 22, 24 and 26 are illustrated in the enlarged view of FIGURE 2 in their relative positions with the lower numbered layers being on the inside of the bottle 12.

The layer 18 is, in the example illustrated in FIGURE 1, polyethylene plastic. The polyethylene inner layer is provided to protect the contents of the bottle 12 from exterior contamination before the bottle is ready for disposal.

The layer 20 is constructed of polystyrene and is provided to give additional stiffness and strength to the bottle 12. Aluminum powder or other additives may be used in conjunction with the layer 20 of the bottle 12.

The layer 22 is a layer of caustic soda which may have aluminum powder mixed therewith. The caustic soda layer when mixed with a liquid reacts with the other layers of the bottle 12 to dissolve the container 10 completely, thereby leaving no litter to clutter parks, highways, streets or alleys or require an expensive housekeeping system for the removal of litter created by disposal of disposable containers.

The subsequent layer 24 is polyvinyl alcohol. The polyvinyl alcohol in the layer 24 is of the temporary type which is soluble in cold water. It is the function of this layer when it is exposed to moisture in the atmosphere, dew, rain or other moisture usually provided by normal environmental conditions, to dissolve and react with the caustic soda layer 22 to provide a product which will dissolve the rest of the container 10.

The layer 26 is a permanent polyvinyl alcohol which is soluble only in hot water. Layer 26 is provided to protect the layer 24 to prevent dissolving of the container 10 before the contents of the container have been disposed of.

The structure 16 comprises a plastic or metal tab 28 connected to a plastic or metal band 30 secured around the neck portion 32 of the bottle 12 between the polyvinyl alcohol layers 24 and 26. After the contents of the bottle 12 have been disposed of, the tab 28 may be pulled to break open the outer layer 26 of polyvinyl alcohol and expose the inner polyvinyl alcohol layer 24, whereby moisture may attack the inner layer 24 of temporary polyvinyl alcohol to initiate dissolving of the bottle 12.

Figure 3:
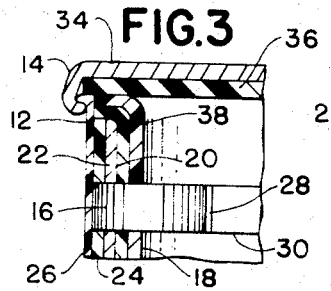
FIGURE 3 is an enlarged partial section view of a portion of the container illustrated in FIGURE 1 taken substantially on the line 3—3 in FIGURE 1.
Figure 4:
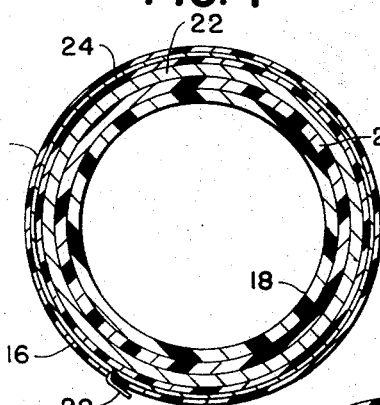
FIGURE 4 is an enlarged cross section view of the container illustrated in FIGURE 1 taken substantially on the line 4—4 in FIGURE 1.

Thus in overall use of the container 10, the bottle 12 and the cap 14 are separately produced with the bottle 12 including the five layers 18, 20, 22, 24 and 26 of polyethylene, polystyrene, caustic soda, temporary polyvinyl alcohol and permanent polyviny alcohol, respectivey. The cap includes the metal or plastic closure portion 34 and the sealing gasket 36 which may be of plastic, rubber, cork or the like. The tab 28 and band 30 are provided between the layers of polyvinyl alcohol and extend from the neck of the bottle 12 respectively, as shown best in FIGURES 3 and 4.

The bottle 12 is filled with the desired contents and the cap is sealed over the open end 38 of the bottle 12. When it is desired to use the contents of the bottle 12, the cap is removed in the usual manner and the contents disposed of as desired. When the contents of the container 10 have been completely disposed of the tab 28 is gripped and the band 30 is pulled outwardly to break the outer polyvinyl alcohol layer 26 around the neck of the bottle 12. The bottle 12 is then discarded and the normal moisture in the air, dew, rain or the like will dissolve the temporary polyvinyl alcohol layer 24 which in turn will mix with the caustic soda layer 22. The product of the polyvinyl alcohol layer 24 and the caustic soda layer 22 will dissolve the rest of the bottle 12.

Figure 5:
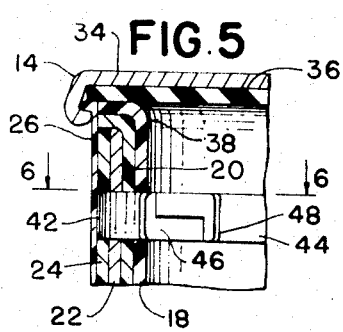
FIGURE 5 is an enlarged partial section view of a modified container, such as illustrated in FIGURE 1, similar to the section view of FIGURE 3.
Figure 6:
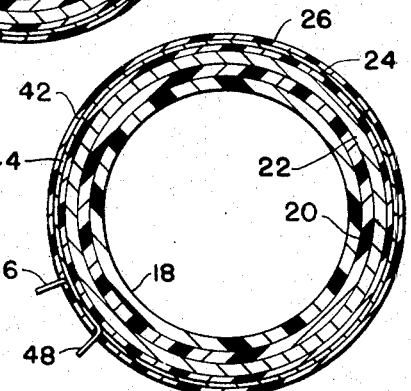
FIGURE 6 is a cross section view of the modified container illustrated in FIGURE 5 taken substantially on the line 6—6 in FIGURE 5.

The modified container structure 40 illustrated in FIGURES 5 and 6 is similar in all respects to the container structure illustrated in FIGURES 1–4 with the exception of the structure 42 which is substituted for the structure 16. The structure 42 includes a band of relatively rigid but deformable material 44, such as metal, positioned around the neck 32 of the bottle 12 between the layers of polyvinyl alcohol having overlapping ends. Two end tabs 46 and 48 extend outwardly from the neck 32 of the body member 12 from the ends of band 44.

Thus in operation on squeezing the tabs 46 and 48 toward each other the radius of the band 44 will be increased to break the outer layer 26 of polyvinyl alcohol and again expose the inner layer of temporary polyvinyl alcohol to the moisture in the atmosphere, whereby the container 40 will be dissolved as before.

Figure 7:
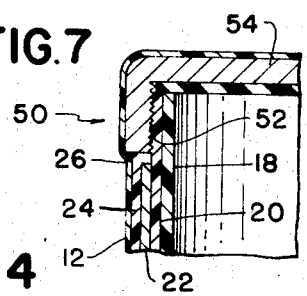
FIGURE 7 is an enlarged partial section view of another modification of the container structure illustrated in FIGURE 1 similar to the section view of FIGURE 3.

The modified container 50 of FIGURE 7 again includes the bottle 12 in which the layers of polyethylene 18 and polystyrene 20 extend above the layers 22 and 24 of caustic soda and temporary polyvinyl alcohol to provide a threaded portion 52 on which the threaded cap 54 is secured. The polyvinyl alcohol layer 26 is then continued over the cap 54 to seal the container 50.

Thus in use of the container 50, when the cap is removed from the container the outer polyvinyl alcohol layer 26 is broken and the inner polyvinyl alcohol layer 24 is exposed to the elements to be subsequently dissolved to produce dissolving of the container 50 as before.

Figure 8:
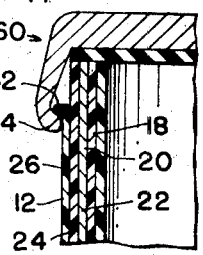
FIGURE 8 is an enlarged partial section view of still another modification of the container structure illustrated in FIGURE 1 similar to the section view of FIGURE 3.

The modified container 60 of FIGURE 8 is similar to the container 12 and again includes the same layers 18, 20, 22, 24 and 26 of the same material. The layer 24 of temporary polyvinyl alcohol however extends above the layer 26 of permanent polyvinyl alcohol adjacent the top of the neck of the bottle 12. The top 14 is secured to the bottle 12 by the annular locking beads 62 and 64 and the natural resiliency of the material of the container. Thus with the container 60 when the top 14 is removed the temporary polyvinyl alcohol layer 24 at the top of the neck of bottle 12 is exposed to initiate dissolving of the container 60.

While one embodiment of the present invention has been considered in detail and modifications thereof suggested, it will be understood that other embodiments and modifications of the invention are contemplate by the inventor. It is the intention to include all embodiments and modifications as are defined by the appended claims within the scope of the invention.

What I claim as my invention is:

1. A disposable container constructed of at least three separate layers including an inner layer completely encompassing and sealing the contents of the container for protecting the contents of the container, an intermediate layer for dissolving the container on being exposed to normal atmospheric conditions and an exterior layer completely sealing the intermediate layer for preventing exposure of the intermediate layer until it is desired to do away with the container.

2. Structure as set forth in claim 1 and further including means integral with the container for selectively doing away with the container, including means for breaking the exterior layer to expose the intermediate layer to normal environmental conditions.

3. Structure as set forth in claim 2 wherein the means for breaking the exterior layer comprises a band of material extending between the intermediate layer and exterior layer and a tab extending outwardly through the exterior layer of the container.

4. Structure as set forth in claim 2 and further including an opening in the container and a cap positioned over the opening and wherein the exterior layer extends over the cap so that it is broken on removing the cap from the container.

5. Structure as set forth in claim 1 wherein the inner layer is polyethylene.

6. Structure as set forth in claim 1 wherein the intermediate layer is caustic soda and temporary polyvinyl alcohol.

7. Structure as set forth in claim 1 wherein the exterior layer is permanent polyvinyl alcohol.

8. A disposable container comprising a bottle having a neck adjacent the top thereof which is constructed of five separate layers of material, the inner layer being polyethylene to protect the contents of the bottle, followed by a polystyrene and aluminum powder layer for adding strength to the inner layer, the next outer layer being a layer of caustic soda and aluminum powder, followed by a layer of temporary polyvinyl alcohol soluble in cold water which is the outer layer of the neck of the bottle adjacent the top thereof and an exterior layer over the rest of the bottle of permanent polyvinyl alcohol and means integral with the container for selectively doing away with the container.

9. Structure as set forth in claim 8 wherein the means for selectively doing away with the container comprises an opening in the container and a cap positioned over the opening and wherein the exterior layer extends over the cap so it is broken on removing the cap from the container.

10. Structure as set forth in claim 8 wherein the means for selectively doing away with the container comprises a band of material positioned between the layers of polyvinyl alcohol and a tab extending outwardly through the exterior layer of polyvinyl alcohol whereby the exterior laer of polyvinyl alcohol is broken on pulling of the tab to expose the layer of temporary polyvinyl alcohol.

References Cited

UNITED STATES PATENTS

| 2,722,311 | 11/1955 | Morrison | 229—3.5 XR |
| 2,750,027 | 6/1956 | Cummings | 206—5 |
| 3,186,869 | 6/1965 | Friedman. | |

DONALD F. NORTON, *Primary Examiner.*

U.S. Cl. X.R.

215—12, 31; 220—64; 229—3.5